US012255402B2

(12) United States Patent
LeBlanc et al.

(10) Patent No.: US 12,255,402 B2
(45) **Date of Patent: *Mar. 18, 2025**

(54) TRANSPARENT ANTENNA STACK AND ASSEMBLY

(71) Applicant: 3M INNOVATIVE PROPERTIES COMPANY, St. Paul, MN (US)

(72) Inventors: Stephen P. LeBlanc, Austin, TX (US); Jeffrey A. Tostenrude, Leander, TX (US); Gregory L Abraham, Austin, TX (US); Vicki L Richmond, Austin, TX (US)

(73) Assignee: 3M INNOVATIVE PROPERTIES COMPANY, St. Paul, MN (US)

(*) Notice: Subject to any disclaimer, the term of this patent is extended or adjusted under 35 U.S.C. 154(b) by 340 days.

This patent is subject to a terminal disclaimer.

(21) Appl. No.: 17/449,469

(22) Filed: Sep. 30, 2021

(65) Prior Publication Data

US 2022/0021130 A1 Jan. 20, 2022

Related U.S. Application Data

(63) Continuation of application No. 17/250,472, filed as application No. PCT/IB2020/055376 on Jun. 8, 2020, now Pat. No. 11,165,171.

(Continued)

(51) Int. Cl.
*H01Q 1/38* (2006.01)
*H01Q 9/04* (2006.01)
(Continued)

(52) U.S. Cl.
CPC ............... *H01Q 21/28* (2013.01); *H01Q 1/38* (2013.01); *H01Q 9/0414* (2013.01); *H01Q 9/285* (2013.01); *H01Q 9/40* (2013.01)

(58) Field of Classification Search
CPC .......... H01Q 1/24; H01Q 1/241; H01Q 1/242; H01Q 1/245; H01Q 1/244; H01Q 1/36;
(Continued)

(56) References Cited

U.S. PATENT DOCUMENTS 6,452,549 B1 9/2002 Lo
6,863,473 B1 3/2005 Tucker
(Continued)

FOREIGN PATENT DOCUMENTS

WO WO 2006-106982 10/2006
WO WO 2011-089219 7/2011

OTHER PUBLICATIONS

Lombardi, Jack P., "Copper Transparent Antennas on Flexible Glass by Substractive and Semi-Additive Fabrication for Automotive Applications", 2018 IEEE 68th Electronic Componnets and Technology Conference, pp. 2107-2115.
(Continued)

*Primary Examiner* — Daniel Munoz
(74) *Attorney, Agent, or Firm* — Robert S. Moshrefzadeh

(57) ABSTRACT

An optically transparent antenna stack includes at least two stacked optically transparent antennas. Each antenna includes an electrically conductive metal mesh including a plurality of interconnected electrically conductive metal traces defining a plurality of enclosed open areas. The metal mesh of each antenna and each lead has a percent open area greater than about 50%. The at least two stacked optically transparent antennas includes a first antenna configured to operate over a first, but not a second, frequency band and a second antenna configured to operate over the second, but not the first, frequency band. The optically transparent antenna stack has an optical transmission of at least about 50% for at least one wavelength in a wavelength range from about 450 nm to about 600 nm.

9 Claims, 8 Drawing Sheets

Related U.S. Application Data

(60) Provisional application No. 62/860,374, filed on Jun. 12, 2019.

(51) Int. Cl.
*H01Q 9/28* (2006.01)
*H01Q 9/40* (2006.01)
*H01Q 21/28* (2006.01)

(58) Field of Classification Search
CPC ........ H01Q 1/362; H01Q 1/364; H01Q 1/366; H01Q 1/368
See application file for complete search history.

(56) References Cited

U.S. PATENT DOCUMENTS

| | | | | |
|---|---|---|---|---|
| 6,933,891 | B2 | 8/2005 | Lange | |
| 7,656,357 | B2 | 2/2010 | Ishibashi et al. | |
| 7,847,753 | B2 | 12/2010 | Ishibashi et al. | |
| 9,537,216 | B1 | 1/2017 | Kontopidis et al. | |
| 11,165,171 | B2 * | 11/2021 | LeBlanc | H01Q 9/40 |
| 2003/0142018 | A1 | 7/2003 | Lange | |
| 2006/0220977 | A1 | 10/2006 | Ogino | |
| 2011/0237309 | A1 * | 9/2011 | Shoji | H01Q 9/42 343/893 |
| 2011/0241969 | A1 * | 10/2011 | Zhang | H01Q 11/04 343/853 |
| 2012/0287002 | A1 | 11/2012 | Parsche | |
| 2012/0287017 | A1 | 11/2012 | Parsche | |
| 2012/0287018 | A1 | 11/2012 | Parsche | |
| 2013/0201063 | A1 | 8/2013 | Mikami | |
| 2013/0264390 | A1 | 10/2013 | Frey et al. | |
| 2014/0327598 | A1 | 11/2014 | Zhu | |
| 2015/0029064 | A1 | 1/2015 | Pan et al. | |
| 2015/0255856 | A1 | 9/2015 | Hong et al. | |
| 2016/0190678 | A1 | 6/2016 | Hong et al. | |
| 2018/0034130 | A1 | 2/2018 | Jang | |
| 2018/0046283 | A1 | 2/2018 | Yoshida et al. | |
| 2019/0326682 | A1 | 10/2019 | Qin | |
| 2020/0251814 | A1 | 8/2020 | Ryu et al. | |
| 2020/0259246 | A1 | 8/2020 | Kim et al. | |
| 2020/0266526 | A1 | 8/2020 | Choi et al. | |
| 2020/0411959 | A1 | 12/2020 | Ryu et al. | |
| 2021/0066790 | A1 | 3/2021 | Park et al. | |

OTHER PUBLICATIONS

PCT International Search Report from PCT/IB2020/055376, mailed on Sep. 8, 2020, 3 pages.

* cited by examiner

TRANSPARENT ANTENNA STACK AND ASSEMBLY

TECHNICAL FIELD

The present disclosure relates generally to antennas, and in particular, to transparent antenna stacks and assemblies.

BACKGROUND

Antennas are typically used for transmitting and receiving electromagnetic signals in networks, for example, cellular networks. For improving network quality and speed, a large number of antennas may have to be deployed at various locations at street level, such as utility poles, street signs, and the like. However, existing regulations may restrict the deployment of these antennas because of the visual impact of the antennas on the environment.

SUMMARY

In one aspect, the present disclosure provides an optically transparent antenna stack. The optically transparent antenna stack includes at least two stacked optically transparent antennas. Each of the optically transparent antennas includes an electrically conductive metal mesh including a plurality of interconnected electrically conductive metal traces. The electrically conductive metal traces define a plurality of enclosed open areas. The at least two stacked optically transparent antennas includes a first antenna configured to operate over a first, but not a second, frequency band and a second antenna configured to operate over the second, but not the first, frequency band. The optically transparent antenna stack has an optical transmission of at least about 50% for at least one wavelength in a wavelength range from about 450 nanometers (nm) to about 600 nm.

In another aspect, the present disclosure provides an antenna assembly. The antenna assembly includes an optically transparent substrate. The antenna assembly further includes a plurality of antennas and a plurality of leads disposed on the substrate. Each antenna and each lead includes an electrically conductive metal mesh including a plurality of interconnected electrically conductive metal traces defining a plurality of enclosed open areas. Each lead corresponds to a different antenna and electrically connects the antenna to a conductive pad for connection to an electrical circuitry. The metal mesh of each antenna and each lead has a percent open area greater than about 50%.

BRIEF DESCRIPTION OF THE DRAWINGS

Exemplary embodiments disclosed herein may be more completely understood in consideration of the following detailed description in connection with the following figures. The figures are not necessarily drawn to scale. Like numbers used in the figures refer to like components. However, it will be understood that the use of a number to refer to a component in a given figure is not intended to limit the component in another figure labeled with the same number.

DETAILED DESCRIPTION

In the following description, reference is made to the accompanying figures that form a part thereof and in which various embodiments are shown by way of illustration. It is to be understood that other embodiments are contemplated and may be made without departing from the scope or spirit of the present disclosure. The following detailed description, therefore, is not to be taken in a limiting sense.

The present disclosure relates to an optically transparent antenna stack including at least two stacked optically transparent antennas. Each antenna includes an electrically conductive metal mesh including multiple interconnected electrically conductive metal traces defining multiple enclosed open areas. The antennas may be configured to operate over non-overlapping frequency bands. The optically transparent antenna stack may blend easily with the environment and may have a reduced visual impact. The optically transparent antenna stack may be flexible and may conform to curved surfaces, such as curved windows.

The present disclosure also relates to an antenna assembly including an optically transparent substrate, and multiple antennas and multiple leads disposed on the substrate. Each antenna and each lead includes an electrically conductive metal mesh including multiple interconnected electrically conductive metal traces defining multiple enclosed open areas. The antenna assembly may blend easily with the environment and may have a reduced visual impact. The antenna assembly may be flexible and may conform to curved surfaces, such as curved windows.

As used herein, a component referred to as "transparent", "substantially transparent", or "optically transparent" allows visible light to pass therethrough without appreciable scattering so that an object lying on an opposing side is visible.

Figure 1:
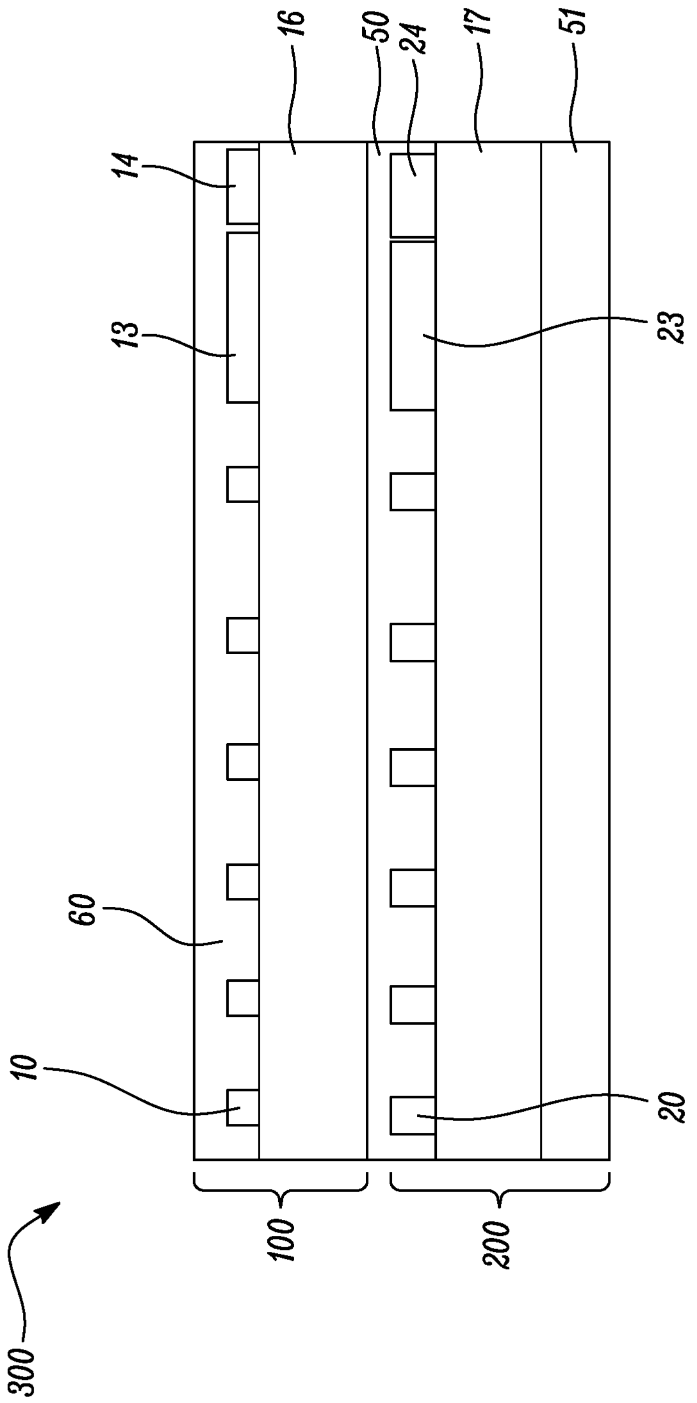
FIG. 1 is a schematic view of an optically transparent antenna stack according to one embodiment of the present disclosure.

Referring now to the Figures, FIG. 1 illustrates an optically transparent antenna stack 300 including stacked optically transparent first and second antennas 100, 200. In some embodiments, one or more additional stacked optically transparent antennas may be included in the optically transparent antenna stack 300. The optically transparent antenna stack 300 may be interchangeably referred to as "the antenna stack 300". Specifically, the antenna stack 300 includes the first antenna 100 and the second antenna 200 stacked on each other. Each of the first and second antennas 100, 200 may be one of a dipole antenna, a monopole antenna, a patch antenna, and so forth. Each of the first and second antennas 100, 200 may have different shapes, such as square, circular, bow-tie, rectangle, elliptical, triangular, polygonal or any other suitable shape. In some embodiment, the first and second antennas 100, 200 are configured to operate over non-contiguous or non-overlapping frequency bands.

Each of the first and second antennas 100, 200 includes an electrically conductive metal mesh 10, 20. Specifically, the first antenna 100 includes the electrically conductive metal mesh 10, and the second antenna 200 includes the electrically conductive metal mesh 20. In some embodiments, the metal mesh 10, 20 of each of the first and second antennas 100, 200 includes one or more of gold, silver, palladium, aluminum, copper, nickel, tin, and any other electrically conductive material. A sheet resistance of each metal mesh 10, 20 may be less than about 0.01 ohm per square, less than about 0.05 ohm per square, less than about 0.1 ohm per square, or less than about 1 ohm per square. In some embodiments, each metal mesh 10, 20 has a percent open area greater than about 50%. In some embodiments, each metal mesh 10, 20 has a percent open area greater than about 70%. In some other embodiments, each metal mesh 10, 20 has a percent open area greater than about 80%.

Figure 3:
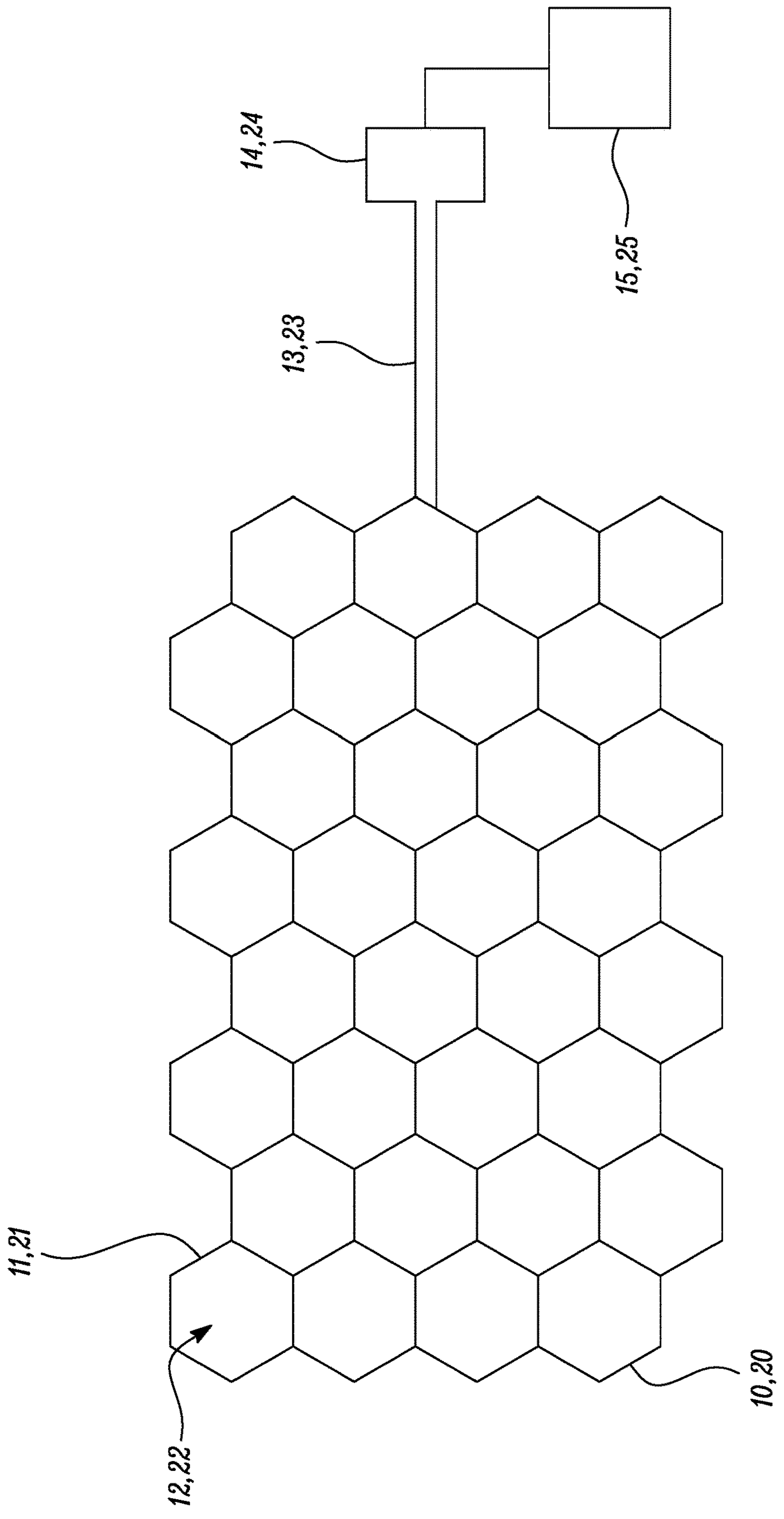
FIG. 3 is a schematic view of an electrically conductive metal mesh of an antenna according to one embodiment of the present disclosure.

Each of the first and second antennas 100, 200 further includes an electrically conductive lead 13, 23 connecting the metal mesh 10, 20 to an electrically conductive pad 14, 24 for connection to electronics 15, 25 (shown in FIG. 3). Specifically, the first antenna 100 includes the electrically conductive lead 13 and the second antenna 200 includes the electrically conductive lead 23. The electrically conductive lead 13 connects the metal mesh 10 to the electrically conductive pad 14 for connection to the electronics 15. Further, the electrically conductive lead 23 connects the metal mesh 20 to the electrically conductive pad 24 for connection to the electronics 25. In some embodiments, each of the electrically conductive leads 13, 23 includes one or more of gold, silver, palladium, aluminum, copper, nickel, tin, and any other electrically conductive material. In some embodiments, each of the electrically conductive pads 14, 24 includes one or more of gold, silver, palladium, aluminum, copper, nickel, tin, and any other electrically conductive material. In some embodiments, a thickness of each electrically conductive lead 13, 23 is in a range from about 0.5 micrometers to about 100 micrometers. In some embodiments, a width of each electrically conductive lead 13, 23 is in a range from about 0.5 micrometers to about 100 micrometers. The thickness of each electrically conductive lead 13, 23 may be measured along a direction substantially perpendicular to the width of each electrically conductive lead 13, 23. In some embodiments, a thickness of each electrically conductive pad 14, 24 is in a range from about 0.5 micrometers to about 100 micrometers. In some embodiments, a width of each electrically conductive pad 14, 24 is in a range from about 0.5 micrometers to about 100 micrometers. The thickness of each electrically conductive pad 14, 24 may be measured along a direction substantially perpendicular to the width of each electrically conductive pad 14, 24.

In some embodiments, for each antenna 100, 200, the metal mesh 10, 20, the conductive lead 13, 23, and the conductive pad 14, 24 have a same composition and approximately a same thickness. Specifically, the metal mesh 10, the conductive lead 13 and the conductive pad 14 have the same composition and approximately the same thickness. Further, the metal mesh 20, the conductive lead 23 and the conductive pad 24 have the same composition and approximately the same thickness.

In the illustrated embodiment of FIG. 1, the metal mesh 10 of the first antenna 100 is disposed on a first substrate 16, and the metal mesh 20 of the second antenna 200 is disposed on a different second substrate 17. Each of the first and second substrates 16, 17 may be made of an electrically insulating material, such as glass or a polymer. Examples of useful polymers for the first and second substrates 16, 17 include polyethylene terephthalate (PET) and polyethylene naphthalate (PEN). In other embodiments, each of the first and second substrates 16, 17 is made of one or more dielectric materials, such as acrylic, polycarbonate, polyvinyl chloride, silicone and the like, in order to provide specific characteristics, such as high temperature resistance, outdoor durability, high strength or to conform to irregular surfaces. Each of the first and second substrates 16, 17 may be substantially planar and flexible while maintaining sufficient rigidity such that excessive bending may not compromise the corresponding metal mesh 10, 20. In some embodiments, each of the first and second substrates 16, 17 may have low passive intermodulation (PIM) (e.g., about −150 dBc) and high radiation efficiency. In some embodiments, each of the first and second substrates 16, 17 is substantially transparent. In some embodiments, each of the first and second substrates 16, 17 has an optical transmission of at least about 50%, at least about 60%, at least about 70%, at least about 80%, at least about 90%, at least about 95%, at least about 98%, or at least about 99% for at least one wavelength in a wavelength range from about 450 nanometers (nm) to about 600 nm.

As shown in FIG. 1, the optically transparent antenna stack 300 further includes a first optically transparent adhesive 50 disposed between the first substrate 16 and the second substrate 17. The first optically transparent adhesive 50 bonds the first substrate 16 to the second substrate 17. The second antenna 200 includes a second optically transparent adhesive 51 disposed on the second substrate 17 opposite to the first optically transparent adhesive 50. The second optically transparent adhesive 51 may allow the optically transparent antenna stack 300 to be secured to interior or exterior surfaces of various structures, such as buildings, utility poles, street signs, street furniture or windows. In some embodiments, each of the optically transparent adhesives 50, 51 has an optical transmission of at least about 80%, at least about 90%, at least about 95%, at least about 98%, or at least about 99% for at least one wavelength in a wavelength range from about 450 nm to about 600 nm. A suitable optically transparent adhesive may be Optically Clear Laminating Adhesive 8141 or 8671 from 3M Company. The optically transparent adhesives 50, 51 may be modified or eliminated in cases where the antenna stack 300 is integrated into another design. For temporary installations, a temporary attachment method may be used, such as a removable adhesive (e.g., 3M Dual Lock) attached to the second substrate 17.

In some embodiments, at least one of the first and second antennas 100, 200 includes one or more of a UV-protective layer 60 and a scratch-resistance layer 61 (shown in FIG. 2) disposed on the metal mesh 10, 20 of the at least one of the first and second antennas 100, 200. In the illustrated embodiment of FIG. 1, the UV-protective layer 60 is disposed on the first antenna 100. In some embodiments, the UV-protective layer 60 is configured to absorb UV radiation. A suitable material for the UV-protective layer 60 may be S20EXT from 3M Company. In some embodiments, the UV-protective layer 60 has an optical transmission of at least about 80%, at least about 90%, at least about 95%, at least about 98%, or at least about 99% for at least one wavelength in a wavelength range from about 450 nm to about 600 nm.

In some embodiments, the optically transparent antenna stack 300 has an optical transmission of at least about 50% for at least one wavelength in a wavelength range from about 450 nm to about 600 nm. In some other embodiments, the optically transparent antenna stack 300 has an optical transmission of at least about 60%, at least about 70%, at least about 80%, or at least about 90% for at least one wavelength in the wavelength range from about 450 nm to about 600 nm.

Figure 2:
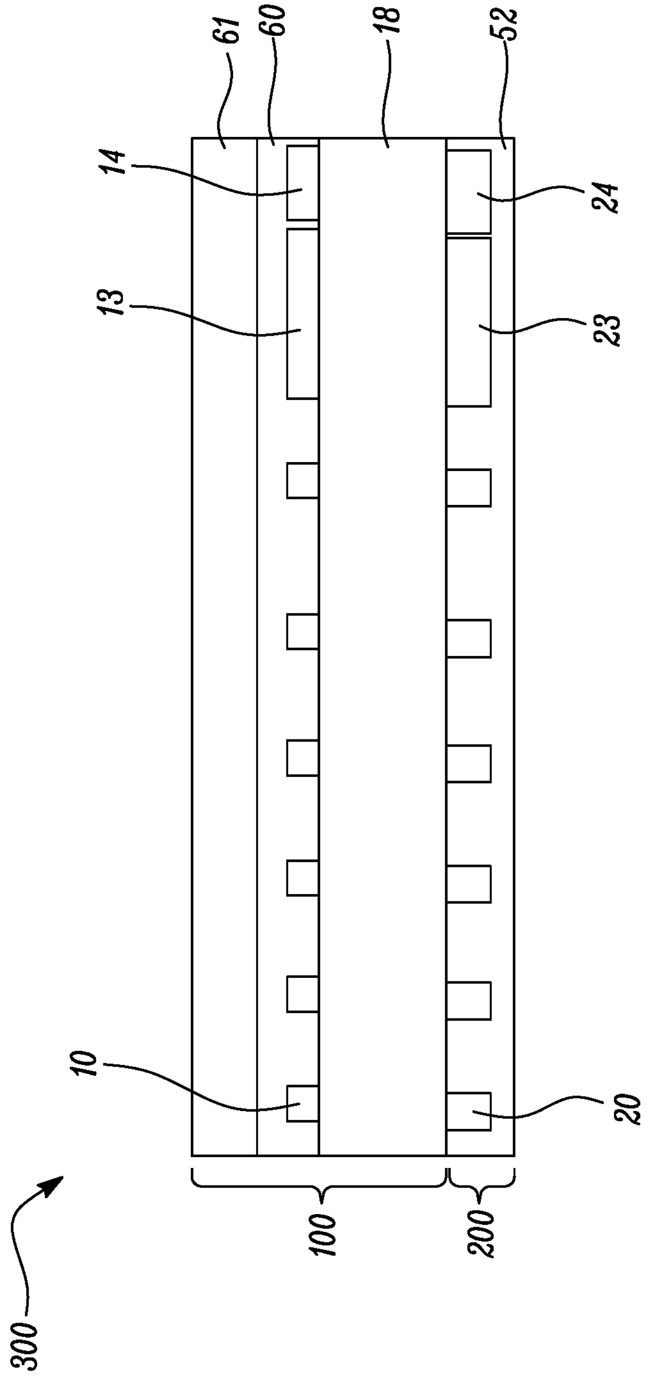
FIG. 2 is a schematic view of the optically transparent antenna stack according to another embodiment of the present disclosure.

FIG. 2 illustrates an alternative embodiment of the optically transparent antenna stack 300. As shown in FIG. 2, the metal meshes 10, 20 of the first and second antennas 100, 200 are disposed on opposite sides of a same substrate 18. Specifically, the first antenna 100 is disposed on a first side of the substrate 18, while the second antenna 200 is disposed on a second side of the substrate 18. The second side is opposite to the first side. The first antenna 100 further includes the electrically conductive lead 13 connecting the metal mesh 10 of the first antenna 100 to the electrically conductive pad 14 for connection to the electronics 15 (shown in FIG. 3). The second antenna 200 further includes the electrically conductive lead 23 connecting the metal mesh 20 of the second antenna 200 to the electrically conductive pad 24 for connection to the electronics 25 (shown in FIG. 3).

The second antenna 200 further includes an optically transparent adhesive 52 disposed on the metal mesh 20 of the second antenna 200 opposite to the substrate 18. The optically transparent adhesive 52 may allow the optically transparent antenna stack 300 to be secured to interior or exterior surfaces of various structures, such as buildings, utility poles, street signs, street furniture or windows. In some embodiments, the optically transparent adhesive 52 has an optical transmission of at least about 80%, at least about 90%, at least about 95%, at least about 98%, or at least about 99% for at least one wavelength in a wavelength range from about 450 nm to about 600 nm. A suitable optically transparent adhesive may be Optically Clear Laminating Adhesive 8141 or 8671 from 3M Company. The optically transparent adhesive 52 may be modified or eliminated in cases where the antenna stack 300 is integrated into another design. For temporary installations, a temporary attachment method may be used, such as a removable adhesive (e.g., 3M Dual Lock) attached to the substrate 18.

As show in FIG. 2, the first antenna 100 further includes the UV protective layer 60 and the scratch-resistant layer 61 disposed on the metal mesh 10 of the first antenna 100. In some embodiments, the UV-protective layer 60 is configured to absorb UV radiation.

The scratch-resistant layer 61 is configured to provide abrasion resistance and protection from environmental elements. In some embodiments, the scratch-resistant layer 61 has an optical transmission of at least about 80%, at least about 90%, at least about 95%, at least about 98%, or at least about 99% for at least one wavelength in a wavelength range from about 450 nm to about 600 nm. The scratch-resistant layer 61 may be made of glass or a polymer.

Since the antenna stack 300 includes an overlaminate including the UV-protective layer 60 and the scratch-resistant layer 61, a conventional radome structure may be eliminated, thereby resulting in an optically transparent antenna. Further, this may enable the optically transparent antenna stack 300 to be installed in locations previously not possible due to aesthetic reasons.

In some other embodiments, the UV-protective layer 60 and the scratch-resistance layer 61 may alternatively or additionally be disposed on the metal mesh 20 of the second antenna 200.

In some embodiments, the optically transparent antenna stack 300 of FIGS. 1 and 2 may be flexible and may conform to curved surfaces, such as curved windows.

In some embodiments, the optically transparent antenna stack 300 of FIGS. 1 and 2 may further include one or more additional layers (not shown), such as an additional mesh layer, an inkjet printable overlaminate, an anti-graffiti protection layer or a thermal interface layer.

The additional mesh layer may be a homogenous macroscopic mesh that acts as a ground plane. The additional mesh layer may alter the radio frequency (RF) radiation characteristics of the first and/or second antennas 100, 200. The additional mesh layer may also act as a heating element that provides an increase in a temperature of a surface to which it is adhered and thereby perform de-icing or de-fogging of the surface. Moreover, the additional mesh layer may also help in increasing antenna efficiency. The additional mesh layer may be identical to the first or the second metal mesh 10, 20. Further, the additional mesh layer may reduce the sheet resistance of the first and/or second antennas 100, 200, thereby improving antenna performance. The additional mesh layer, and the first or the second metal mesh 10, 20 may be separated by a substrate. The additional mesh layer, and the first or the second metal mesh 10, 20 may both be active elements of the first or the second antennas 100, 200.

The inkjet printable overlaminate may further provide concealment or allow more installation alternatives by adding graphics printed on the exterior surface of the optically transparent antenna stack 300.

The anti-graffiti protection layer may be added to the optically transparent antenna stack 300 to provide protection against paint, scratches and gouges. For example, an overlaminate of 3M AG-6 or a similar material, may be added.

The thermal interface layer with a high thermal conductivity may be added to provide heat transfer away from the optically transparent antenna stack 300.

FIG. 3 illustrates an exemplary hexagonal electrically conductive metal mesh. At least one of the metal mesh 10, 20 may be embodied as the hexagonal mesh of FIG. 3. The hexagonal mesh is exemplary in nature, and each metal mesh 10, 20 may have alternative patterns. The metal mesh 10, 20 includes a plurality of interconnected electrically conductive metal traces 11, 21. Specifically, the metal mesh 10 includes the interconnected electrically conductive metal traces 11. Further, metal mesh 20 includes the interconnected electrically conductive metal traces 21. The metal traces 11, 21 define a plurality of enclosed open areas 12, 22 within the metal mesh 10, 20. Specifically, the metal traces 11 define the enclosed open areas 12 that are not deposited with conductor. Further, the metal traces 21 define the enclosed open areas 22 that are not deposited with conductor. In some embodiments, each metal mesh 10, 20 has a percent open area greater than about 50%. In some embodiments, each metal mesh 10, 20 has a percent open area greater than about 80%. In some other embodiments, each metal mesh 10, 20 has a percent open area greater than about 60%, greater than about 70%, greater than about 90%, or greater than about 95%.

The metal mesh 10, 20 further includes the electrically conductive leads 13, 23. The electrically conductive leads 13, 23 connects the metal mesh 10, 20 to the electrically conductive pads 14, 24 for connection to the electronics 15, 25. Specifically, the metal mesh 10 includes the electrically conductive lead 13 that electrically connects the metal mesh 10 to the electrically conductive pad 14. Further, the metal mesh 20 includes the electrically conductive lead 23 that electrically connects the metal mesh 20 to the electrically conductive pad 24. The electrically conductive pads 14, 24 connect the respective first and second antennas 100, 200 to the respective electronics 15, 25. The electronics 15, 25 may include one or more electronic devices and circuits, such as a transmitter, a receiver, or a transceiver.

The metal mesh 10, 20 may be of homogenous distribution or arranged in a macroscopic manner to provide specific radio frequency (RF) radiation patterns. The arrangement of the metal traces 11, 21 may be generated using one of several processes, such as etching, die-cutting, laser cutting or any other suitable processes. In some other embodiments, the metal traces 11, 21 of the metal mesh 10, 20 may be formed in an open-mesh design. The metal mesh may be of a design such that PIM performance meets or exceeds industry standards.

A line width and a line pitch of each metal mesh 10, 20 may be optimized so that each metal mesh 10, 20 may be substantially transparent from a distance. In some embodiments, the line pitch of each metal mesh 10, 20 may range from about 200 micrometers to about 3000 micrometers to provide greater transparency while minimizing the sheet resistance. In some embodiments, the metal traces 11, 21 have widths between 0.5 micrometers and 100 micrometers. In some other embodiments, the metal traces 11, 21 have widths between 5 micrometers and 100 micrometers, or between 10 micrometers and 50 micrometers. In some embodiments, the metal traces 11, 21 have thicknesses between 0.5 micrometers and 100 micrometers. In some other embodiments, the metal traces 11, 21 have thicknesses between 5 micrometers and 100 micrometers, or between 10 micrometers and 50 micrometers. The thicknesses of the metal traces 11, 21 may be measured along a direction that is substantially perpendicular to the widths of the metal traces 11, 21. The thicknesses, widths and pitch of the metal traces 11, 21 are exemplary, and may be varied as per desired application attributes. In some embodiments, each metal mesh 10, 20 has an optical transmission of at least about 50%, at least about 60%, at least about 70%, at least about 80%, or at least about 90% for at least one wavelength in the wavelength range from about 450 nm to about 600 nm.

Figure 4:
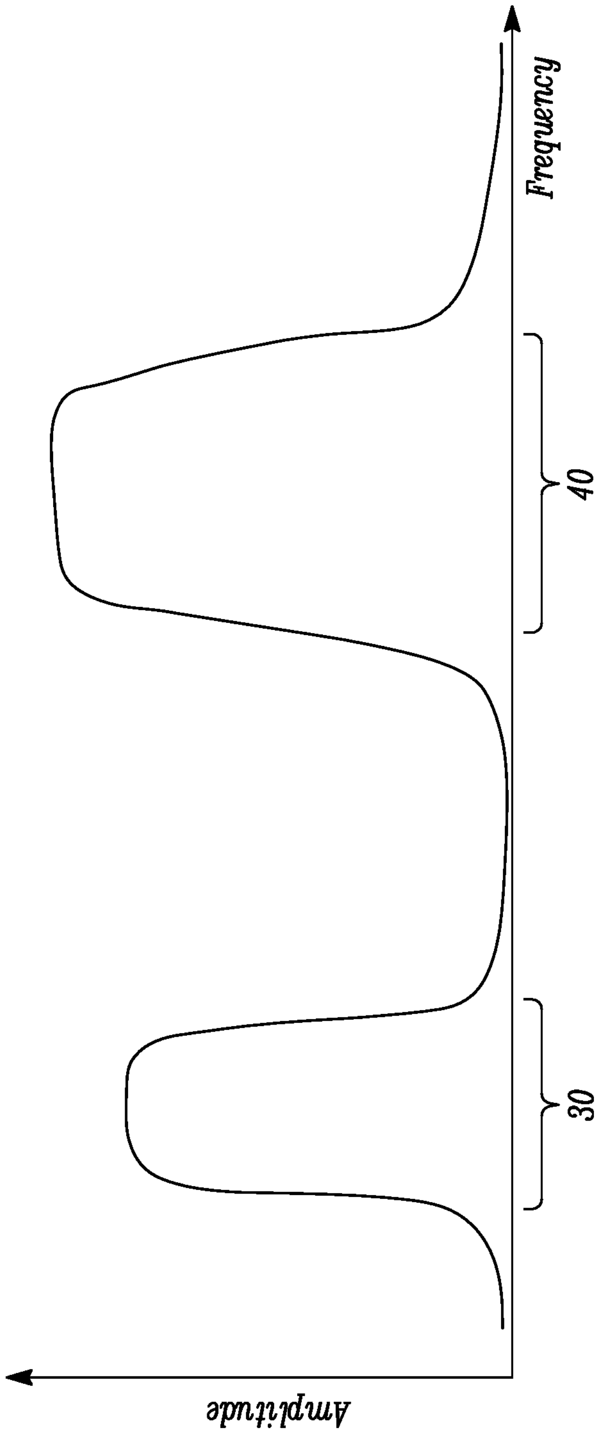
FIG. 4 is an exemplary plot showing operating frequency bands of different antennas.

Referring to FIGS. 1 to 3, in some embodiments, the optically transparent antenna stack 300 may support various frequency bands. FIG. 4 shows an exemplary plot of operating frequency bands of the first and second antennas 100, 200. In order to achieve a wide bandwidth or support different frequency bands, the first and second antennas 100, 200 may support non-contiguous frequency bands. In some embodiments, the first antenna 100 is configured to operate over a first frequency band 30, but not a second frequency band 40. The second antenna 200 is configured to operate over the second frequency band 40, but not the first frequency band 30. As shown in FIG. 4, the first and second frequency bands 30, 40 are non-contiguous frequency bands.

Figure 5A:
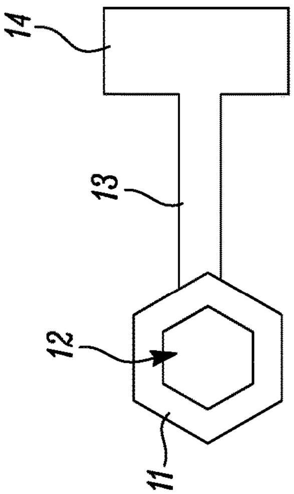
FIGS. 5A and 5B are schematic views of electrically conductive metal traces of different antennas according to one embodiment of the present disclosure.
Figure 5B:
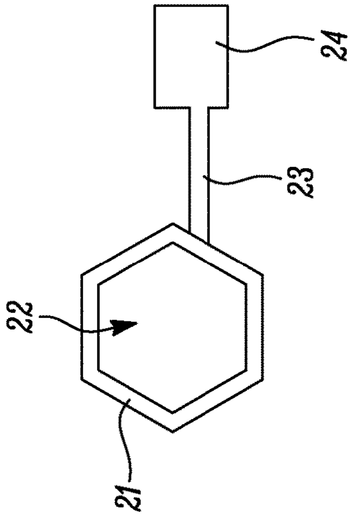

FIGS. 5A and 5B illustrate the interconnected electrically conductive metal traces 11, 21 for the first and second antennas 100, 200, respectively. In the illustrated embodiment of FIGS. 5A and 5B, the metal traces 11 of the metal mesh 10 of the first antenna 100 are wider than the metal traces 21 of the metal mesh 20 of the second antenna 200. Similarly, the conductive lead 13 of the first antenna 100 is wider than the conductive lead 23 of the second antenna 200. Moreover, the conductive pad 14 of the first antenna 100 is wider than the conductive pad 24 of the second antenna 200. In some other embodiments, the metal traces 21 of the metal mesh 20 of the second antenna 200 may be wider than the metal traces 11 of the metal mesh 10 of the first antenna 100. Further, the conductive lead 23 of the second antenna 200 may be wider than the conductive lead 13 of the first antenna 100. Moreover, the conductive pad 24 of the second antenna 200 may be wider than the conductive pad 14 of the first antenna 100.

FIGS. 6A-6E show different embodiments of each of the electrically conductive metal meshes 10, 20. Various metal mesh patterns may be implemented, such as rectilinear, hexagonal, bubble, polygons or any other type. In some embodiments, as illustrated in FIGS. 6A-6E, the metal mesh 10, 20 of each of the first and second antennas 100, 200 includes one or more of a hexagonal mesh 90, a square mesh 91, a rectangular mesh 92, a curved mesh 93, a linear mesh 91, a non-linear mesh 93, a random mesh 94, and a periodic mesh, for example, the metal meshes 90, 91, or 92.

Figure 6A:
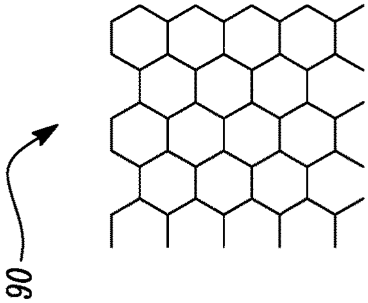
FIGS. 6A-6E are schematic views of different types of the electrically conductive metal mesh.
Figure 6B:
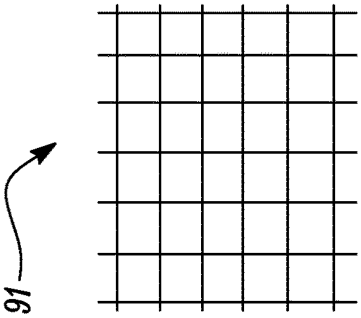
Figure 6C:
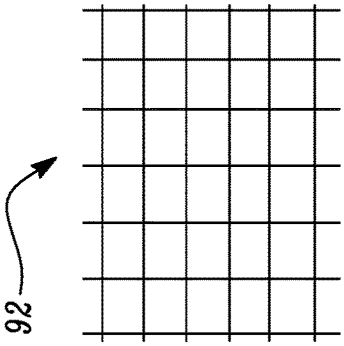
Figure 6D:
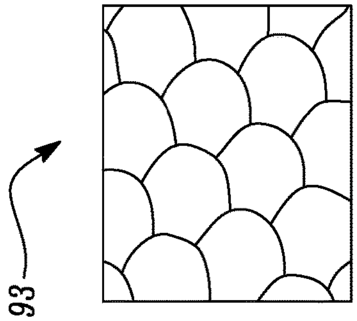
Figure 6E:
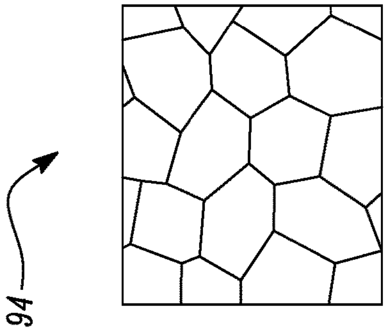

Specifically, as shown in FIG. 6A, the metal mesh 10, 20 of each of the first and second antennas 100, 200 may be the hexagonal mesh 90. As shown in FIG. 6B, the metal mesh 10, 20 of each of the first and second antennas 100, 200 may be the square mesh 91. As shown in FIG. 6C, the metal mesh 10, 20 of each of the first and second antennas 100, 200 may be the rectangular mesh 92. Further, the metal mesh 10, 20 of each of the first and second antennas 100, 200 may be a periodic mesh, for example, the hexagonal mesh 90, the square mesh 91 or the rectangular mesh 92. As shown in FIG. 6D, the metal mesh 10, 20 of each of the first and second antennas 100, 200 may be the non-linear and curved mesh 93. As shown in FIG. 6E, the metal mesh 10, 20 of each of the first and second antennas 100, 200 may be the random mesh 94.

The optically transparent antenna stack 300 may blend easily with the environment and may have a reduced visual impact. Further, the optically transparent antenna stack 300 may be easily deployed at various locations via an optically transparent adhesive.

Figure 7:
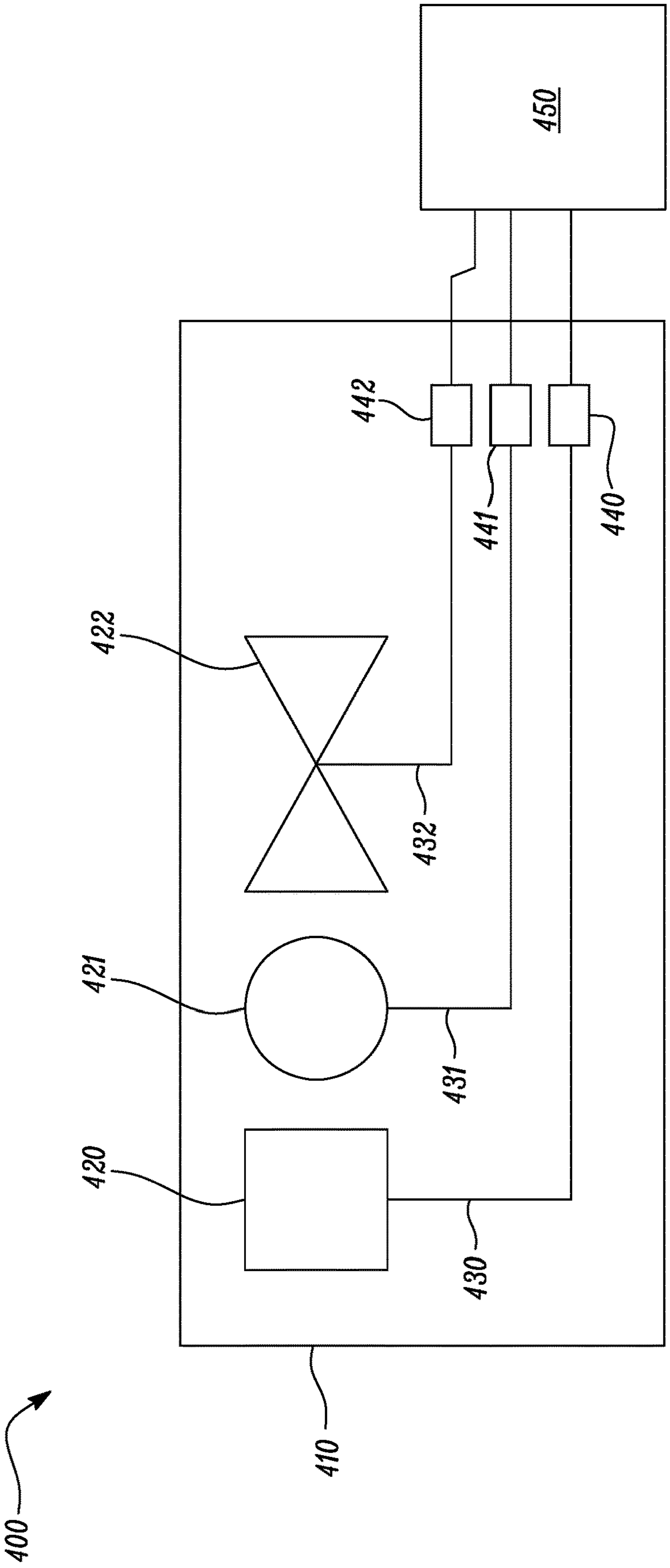
FIG. 7 is a schematic view of an antenna assembly according to one embodiment of the present disclosure.

FIG. 7 shows an antenna assembly 400. The antenna assembly 400 includes an optically transparent substrate 410. The transparent substrate 410 may be formed from an electrically insulating material, such as glass or a polymer. Examples of useful polymers for the transparent substrate 410 includes polyethylene terephthalate (PET) and polyethylene naphthalate (PEN). In other embodiments, the transparent substrate 410 may be made of one or more dielectric materials, such as acrylic, polycarbonate, polyvinyl chloride, silicone and the like, in order to provide specific characteristics, such as high temperature resistance, outdoor durability, high strength or to conform to irregular surfaces. In some embodiments, the transparent substrate 410 may have low PIM (e.g., about −150 dBc) and high radiation efficiency. In some embodiments, the transparent substrate 410 is substantially transparent. In some embodiments, the transparent substrate 410 has an optical transmission of at least about 50%, at least about 60%, at least about 70%, at least about 80%, at least about 90%, at least about 95%, at least about 98%, or at least about 99% for at least one wavelength in a wavelength range from about 450 nm to about 600 nm.

The antenna assembly 400 includes a plurality of antennas 420, 421, 422. Each of the plurality of antennas 420, 421, 422 may be one of a dipole antenna, a monopole antenna, a patch antenna, and so forth. The plurality of antennas 420, 421, 422 may have different shapes, such as square, circular, bow-tie, rectangle, elliptical, triangular, polygonal or any other suitable shape. In some embodiments, at least two antennas of the plurality of antennas 420, 421, 422 have different shapes. For example, the antenna 420 has a square shape, while the antenna 421 has a circular shape. Further, the antenna 422 has a bow-tie shape. In some embodiments, the plurality of antennas 420, 421, 422 may support non-contiguous frequency bands.

As shown in FIG. 7, the plurality of antennas 420, 421, 422 are disposed on one side the transparent substrate 410. In some other embodiments, at least one antenna of the plurality of antennas 420, 421, 422 is disposed on one side of the transparent substrate 410, and at least one other antenna of the plurality of antennas 420, 421, 422 is disposed on an opposite side of the transparent substrate 410. For example, the antennas 420, 421 may be disposed on one side of the transparent substrate 410, while the antenna 422 may be disposed on the opposite side of the transparent substrate 410. Such a configuration may be substantially similar to the antenna stack 300 shown in FIG. 2.

The antenna assembly 400 further includes a plurality of leads 430, 431, 432. The plurality of leads 430, 431, 432 are disposed on the transparent substrate 410. Each of the plurality of antennas 420, 421, 422 and each of the plurality of leads 430, 431, 432 includes an electrically conductive mesh. In some embodiments, each antenna 420, 421, 422 and each lead 430, 431, 432 includes the electrically conductive metal mesh 10, as shown in FIG. 3. The electrically conductive metal mesh 10 includes the plurality of interconnected electrically conductive metal traces 11 defining the plurality of enclosed open areas 12. Specifically, the metal traces 11 define the enclosed open areas 12 that are not deposited with conductor. The metal mesh 10 includes one or more of gold, silver, palladium, aluminum, copper, nickel, tin, and any other electrically conductive material. The sheet resistance of the metal mesh 10 may be less than about 0.01 ohm per square, less than about 0.05 ohm per square, less than about 0.1 ohm per square, or less than about 1 ohm per square. In some embodiments, the metal mesh 10 of each antenna 420, 421, 422 and each lead 430, 431, 432 has a percent open area greater than about 50%. In some embodiments, the metal mesh 10 of each antenna 420, 421, 422 and each lead 430, 431, 432 has a percent open area greater than about 70%. In some other embodiments, the metal mesh 10 of each antenna 420, 421, 422 and each lead 430, 431, 432 has a percent open area greater than about 80%.

The transparent substrate 410 may be substantially planar and flexible while maintaining enough rigidity such that excess bending may not compromise the metal mesh 10. A line width, and a line pitch of the metal mesh 10 may be optimized such that the metal mesh 10 may be substantially transparent from a distance. In some embodiments, the line pitch of the metal mesh 10 may range from about 200 micrometers to about 3000 micrometers to allow greater transparency while minimizing the sheet resistance. In some embodiments, the metal traces 11 of the metal mesh 10 in each lead 430, 431, 432 have widths between 0.5 micrometers and 100 micrometers. In some other embodiments, the metal traces 11 of the metal mesh 10 in each lead 430, 431, 432 have widths between 5 micrometers and 100 micrometers, or between 10 micrometers and 50 micrometers. In some embodiments, the metal traces 11 of the metal mesh 10 in each lead 430, 431, 432 have thicknesses between 0.5 micrometers and 100 micrometers. In some other embodiments, the metal traces 11 of the metal mesh 10 in each lead 430, 431, 432 have thicknesses between 5 micrometers and 100 micrometers, or between 10 micrometers and 50 micrometers. In some other embodiments, the metal traces 11 of the metal mesh 10 in each antenna 420, 421, 422 have widths between 5 micrometers and 100 micrometers, or between 10 micrometers and 50 micrometers. In some embodiments, the metal traces 11 of the metal mesh 10 in each antenna 420, 421, 422 have thicknesses between 0.5 micrometers and 100 micrometers. In some other embodiments, the metal traces 11 of the metal mesh 10 in each antenna 420, 421, 422 have thicknesses between 5 micrometers and 100 micrometers, or between 10 micrometers and 50 micrometers. The thicknesses of the metal traces 11 may be measured along a direction substantially perpendicular to the widths of the metal traces 11. The thicknesses, widths and pitch of the metal traces 11 are exemplary, and may be varied as per desired application attributes. In some embodiments, the metal mesh 10 has an optical transmission of at least about 50%, at least about 60%, at least about 70%, at least about 80%, or at least about 90% for at least one wavelength in the wavelength range from about 450 nm to about 600 nm.

Various metal mesh patterns may be implemented, such as rectilinear, hexagonal, bubble, polygons or any other type. In some embodiments, the metal mesh 10 of each antenna 420, 421, 422 includes one or more of the hexagonal mesh 90, the square mesh 91, the rectangular mesh 92, the curved mesh 93, the linear mesh 91, the non-linear mesh 93, the random mesh 94, and the periodic mesh 90, 91 or 92, as shown in FIGS. 6A-6E.

Each lead 430, 431, 432 corresponds to a different antenna and electrically connects the antenna to a conductive pad 440, 441, 442 for connection to an electrical circuitry 450. Specifically, as shown in FIG. 7, the lead 430 corresponds to the antenna 420 and electrically connects the antenna 420 to the conductive pad 440 for connection to the electrical circuitry 450. Further, the lead 431 corresponds to the antenna 421 and electrically connects the antenna 421 to the conductive pad 441 for connection to the electrical circuitry 450. Moreover, the lead 432 corresponds to the antenna 422 and electrically connects the antenna 422 to the conductive pad 442 for connection to the electrical circuitry 450. The electrical circuitry 450 may include one or more of a transmitter, a receiver, or a transceiver.

In some embodiments, the antenna assembly 400 may support various frequency bands. In one embodiment, in order to achieve a wide bandwidth, the antennas 420, 421, 422 may support different non-contiguous frequency bands. For example, referring to FIG. 4, the antenna 420 may be configured to operate over the first frequency band 30, but not the second frequency band 40. The antenna 421 may be configured to operate over the second frequency band 40, but not the first frequency band 30. The antenna 422 may operate over a third frequency band (not shown) different from the first and second frequency bands 30, 40.

In some embodiments, the metal traces 11 of the metal mesh 10 may have varying widths across the antennas 420, 421, 422 and the corresponding leads 430, 431, 432. For example, the metal traces 11 of the antenna 420 may be wider than the metal traces 11 of the antennas 421, 422. Further, the metal traces 11 of the antenna 421 may be wider than the metal traces 11 of the antenna 422. Similarly, the metal traces 11 of the lead 430 may be wider than the metal traces 11 of the leads 431, 432. Further, the metal traces 11 of the lead 431 may be wider than the metal traces 11 of the lead 432.

Figure 8:
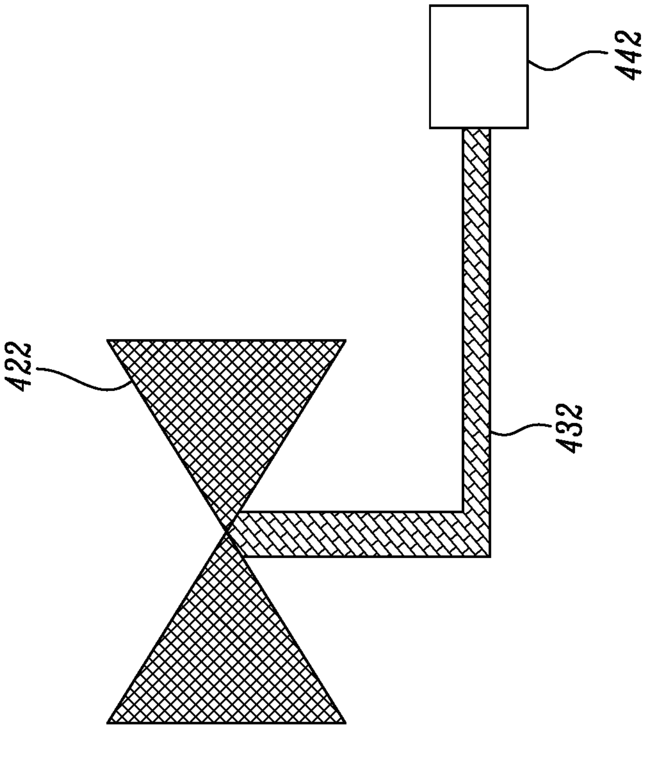
FIG. 8 is a schematic view of an antenna with a lead according to one embodiment of the present disclosure.

In some embodiments, the metal traces 11 of the metal mesh 10 in at least one antenna 420, 421, 422 and in at least one lead 430, 431, 432 have uniform widths. For example, as shown in FIG. 8, the antenna 422 and the lead 432 have metal traces of uniform widths.

Figure 9:
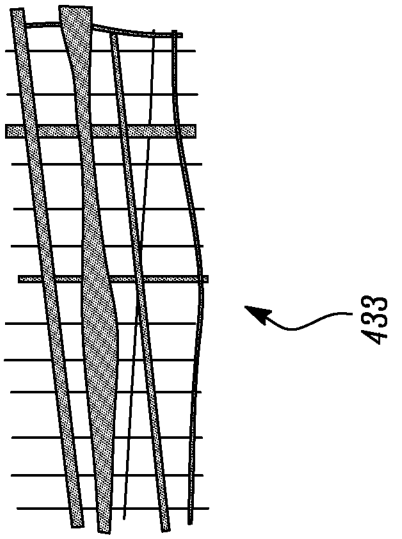
FIG. 9 is a schematic view of a lead according to one embodiment of the present disclosure.

In some other embodiments, the metal traces 11 of the metal mesh 10 in at least one lead 430, 431, 432 have varying widths. For example, as shown in FIG. 9, a lead 433 have metal traces of varying widths. The lead 433 may be correspond to at least one of the antennas 420, 421, 422.

In some embodiments, the antenna assembly 400 may be flexible and may conform to curved surfaces, such as curved windows.

The antenna assembly 400 may blend easily with the environment and have a reduced visual impact. A number and arrangement of antennas in the antenna assembly 400 may be varied as per desired application attributes.

In one embodiment, the antenna assembly 400 may further include multiple arrays of antennas. Each array may include multiple antennas. A number of antennas in each array may vary, for example, two, four, eight, or sixteen. Further, the antennas in each array may be arranged in a row, a column, or a combination thereof. Several arrays of the antennas may be combined and assembled together to form a larger multiple input multiple output (MIMO) antenna. In this embodiment, each array may be contained within a specific portion of the transparent substrate 410 or contained within other arrays. Each array may be connected to an edge connector card by a transmission line, such as a microstrip or a stripline. The edge connector card may have a connection mechanism to enable connection to coaxial cables. The connection mechanism may be a solder joint, a highly conductive adhesive, or a mechanical compression fixture. The edge connector card may further include a phase shifter used to substantially equalize length variations of transmission lines among the various antennas. In order to achieve a wide bandwidth, several antenna arrays may support various non-contiguous frequency bands.

Unless otherwise indicated, all numbers expressing feature sizes, amounts, and physical properties used in the specification and claims are to be understood as being modified by the term "about". Accordingly, unless indicated to the contrary, the numerical parameters set forth in the foregoing specification and attached claims are approximations that can vary depending upon the desired properties sought to be obtained by those skilled in the art utilizing the teachings disclosed herein.

Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

The invention claimed is:

1. An antenna assembly comprising a plurality of stacked antennas, the stacked antennas having an optical transmission of at least about 50% for at least one wavelength in a wavelength range from about 450 nm to about 600 nm, a first antenna in the plurality of stacked antennas configured to operate over a first, but not a second, frequency band and a second antenna in the plurality of stacked antennas configured to operate over the second, but not the first, frequency band, wherein for at least one antenna in the plurality of stacked antennas, the antenna assembly comprises an electrically conductive lead connecting the antenna to an electrically conductive pad for connection to electronics, the electrically conductive lead comprising an electrically conductive metal mesh comprising a plurality of interconnected electrically conductive metal traces defining a plurality of enclosed open areas, the metal traces having varying widths.

2. The antenna assembly of claim 1, wherein each antenna of the at least one antenna in the plurality of stacked antennas comprises an electrically conductive metal mesh comprising a plurality of interconnected electrically conductive metal traces defining a plurality of enclosed open areas.

3. The antenna assembly of claim 2, wherein the metal traces of the at least one antenna have widths between 0.5 micrometers and 100 micrometers and thicknesses between 0.5 micrometers and 100 micrometers.

4. The antenna assembly of claim 2, wherein for each antenna of the at least one antenna, the metal mesh of the antenna, the lead and the pad have a same composition and approximately a same thickness.

5. The antenna assembly of claim 2, wherein the metal mesh of the at least one antenna has a percent open area greater than about 80%.

6. The antenna assembly of claim 1, wherein at least two antennas in the plurality of stacked antennas are disposed on opposite sides of a same substrate.

7. The antenna assembly of claim 1, wherein at least one antenna in the plurality of stacked antennas comprises one or more of gold, silver, palladium, platinum, aluminum, copper, nickel, and tin.

8. The antenna assembly of claim 1, wherein each of the first and second antennas comprises an electrically conductive metal mesh comprising a plurality of interconnected electrically conductive metal traces defining a plurality of enclosed open areas.

9. The antenna assembly of claim 8, wherein the metal traces of the first and second antennas have different widths.

* * * * *